US010396458B2

(12) United States Patent
Shen et al.

(10) Patent No.: US 10,396,458 B2
(45) Date of Patent: Aug. 27, 2019

(54) SWITCH ASSEMBLY, SWITCH ASSEMBLY CONTROL METHOD, CONTROLLER, AND BASE STATION

(71) Applicant: Huawei Technologies Co., Ltd., Shenzhen (CN)

(72) Inventors: Jian Shen, Shenzhen (CN); Fangqing Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 15/370,910

(22) Filed: Dec. 6, 2016

(65) Prior Publication Data

US 2017/0084996 A1 Mar. 23, 2017

Related U.S. Application Data

(63) Continuation of application No. PCT/CN2015/080723, filed on Jun. 3, 2015.

(30) Foreign Application Priority Data

Jun. 6, 2014 (CN) .......................... 2014 1 0249347

(51) Int. Cl.
*H04M 1/00* (2006.01)
*H01Q 3/36* (2006.01)
(Continued)

(52) U.S. Cl.
CPC .................. *H01Q 3/36* (2013.01); *H01P 1/12* (2013.01); *H01Q 1/246* (2013.01); *H01Q 21/06* (2013.01); *H01Q 21/22* (2013.01); *Y02P 90/04* (2015.11)

(58) Field of Classification Search
CPC . H04B 1/44; H01Q 3/36; H01Q 1/246; H01Q 21/06; H01Q 21/22
See application file for complete search history.

(56) References Cited

U.S. PATENT DOCUMENTS

| 4,331,853 A | 5/1982 | Ireland |
| 7,501,775 B2 | 3/2009 | Valdemarsson et al. |

(Continued)

FOREIGN PATENT DOCUMENTS

| CN | 1475021 A | 2/2004 |
| CN | 102055069 A | 5/2011 |

(Continued)

OTHER PUBLICATIONS

Guo-Cheng et al., "Design of a Wireless Remote Switch Control System," vol. 9, No. 1, Institute of Information Science and Engineering (Feb. 2002).

*Primary Examiner* — Tuan Pham
(74) *Attorney, Agent, or Firm* — Leydig, Voit & Mayer, Ltd.

(57) ABSTRACT

A switch assembly, a switch assembly control method, a controller, and a base station are disclosed, which relate to the wireless communications field. The switch assembly includes: a mechanical normally open switch (102), a movable contact (104), and a controller (106), where the controller (106) is connected to a phase shifter (108) of a remote electrical tilt unit, and the movable contact (104) is arranged to move with a driving rod (1082) of the phase shifter (108); when the movable contact (104) reaches a specified position, the mechanical normally open switch (102) is triggered to close. A prior-art problem that interference is caused to a base station signal because an integrated semiconductor chip radio frequency switch is a nonlinear element and a problem that installation is relatively difficult because a volume of a relay switch is relatively large are resolved.

8 Claims, 5 Drawing Sheets

(51) Int. Cl.
*H01Q 1/24* (2006.01)
*H01Q 21/22* (2006.01)
*H01P 1/12* (2006.01)
*H01Q 21/06* (2006.01)

(56) References Cited

U.S. PATENT DOCUMENTS

| | | |
|---|---|---|
| 8,027,703 B2 | 9/2011 | Girard et al. |
| 2004/0102221 A1 | 5/2004 | Shirosaka et al. |
| 2004/0185904 A1 | 9/2004 | Yamakita |
| 2005/0105552 A1* | 5/2005 | Osterling ............ H04W 88/085 370/466 |
| 2007/0008103 A1* | 1/2007 | Nicolls .............. G01R 31/3277 340/515 |
| 2009/0135074 A1 | 5/2009 | Yang et al. |
| 2010/0201591 A1 | 8/2010 | Girard et al. |
| 2012/0196545 A1 | 8/2012 | Schmidt et al. |
| 2014/0197763 A1 | 7/2014 | Liu et al. |
| 2015/0357708 A1* | 12/2015 | Au ........................... H01Q 3/08 343/760 |

FOREIGN PATENT DOCUMENTS

| | | |
|---|---|---|
| CN | 202395751 U | 8/2012 |
| CN | 102386030 A | 10/2014 |
| CN | 104090531 A | 10/2014 |
| JP | 2004173062 A | 6/2004 |
| JP | 2004289220 A | 10/2004 |
| JP | 2010011065 A | 1/2010 |
| JP | 2010096433 A | 4/2010 |
| JP | 2011205609 A | 10/2011 |
| WO | 2009102774 A2 | 8/2009 |

* cited by examiner

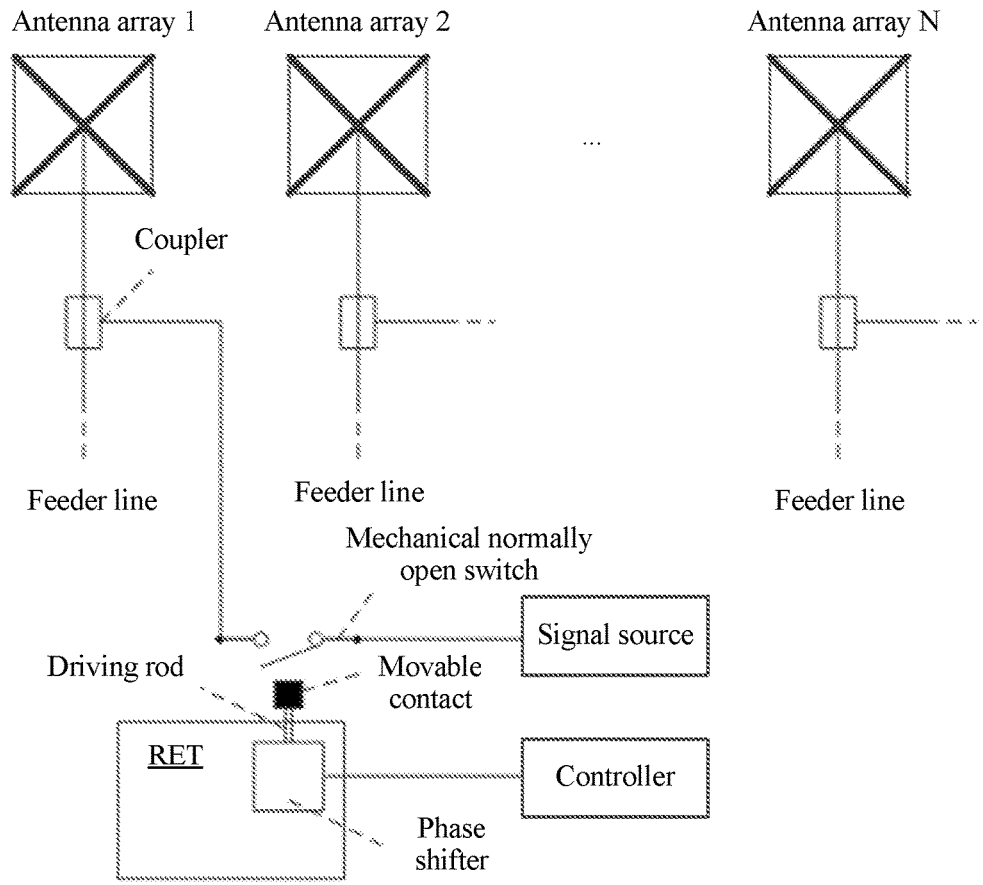

FIG. 5

A controller receives an operation instruction, where the operation instruction is used to instruct the controller to control the mechanical normally open switch to close — 302

The controller sends a control instruction to a phase shifter, where the control instruction is used to instruct the phase shifter to drive a driving rod, so that a movable contact moves to a specified position — 304

FIG. 6

SWITCH ASSEMBLY, SWITCH ASSEMBLY CONTROL METHOD, CONTROLLER, AND BASE STATION

CROSS-REFERENCE TO RELATED APPLICATIONS

This application is a continuation of International Application No. PCT/CN2015/080723, filed on Jun. 3, 2015, which claims priority to Chinese Patent Application No. 201410249347.X, filed on Jun. 6, 2014. The disclosures of the aforementioned applications are hereby incorporated by reference in their entireties.

TECHNICAL FIELD

The present application relates to the wireless communications field, and in particular, to a switch assembly, a switch assembly control method, a controller, and a base station.

BACKGROUND

In a wireless communications base station, a scenario in which gating is performed on a signal or a power supply is usually involved. When gating is being performed on a signal or a power supply, a corresponding gating switch usually needs to be arranged.

In the prior art, an integrated semiconductor chip switch or a relay switch is usually used as a gating switch in a base station. An internal test on an antenna array is used as an example. When the base station performs an internal test on an antenna array, a test signal generated by a signal source needs to be sent to the antenna array to be tested. Specifically, an integrated semiconductor chip switch or a relay switch may be arranged as a gating switch between the signal source and the antenna array. A controller controls the gating switch to open or close.

In a process of implementing the present application, the inventor finds that the prior art has at least the following problem:

A switch used currently is an integrated semiconductor chip switch or a relay switch. The integrated semiconductor chip switch is a nonlinear element, where spacing between ports is relatively small, which easily causes interference to a base station signal and easily causes intermodulation distortion. A volume of the relay switch is relatively large, which causes installation to be relatively difficult.

SUMMARY

To resolve a prior-art problem that interference is caused to a base station signal because an integrated semiconductor chip radio frequency switch is a nonlinear element and a problem that installation is relatively difficult because a volume of a relay switch is relatively large, embodiments of the present application provide a switch assembly, a switch assembly control method, a controller, and a base station. The technical solutions are as follows:

According to a first aspect, a switch assembly is provided, which is used in a base station that includes a remote electrical tilt unit, where the switch assembly includes: a mechanical normally open switch, a movable contact, and a controller, where the controller is connected to a phase shifter of the remote electrical tilt unit, and the movable contact is arranged to move with a driving rod of the phase shifter; when the movable contact reaches a specified position, the mechanical normally open switch is triggered to close;

the controller is configured to receive an operation instruction, where the operation instruction is used to instruct the controller to control the mechanical normally open switch to close;

the controller is configured to send a control instruction to the phase shifter; and the phase shifter is configured to receive the control instruction, and drive the driving rod according to the control instruction, so that the movable contact moves to the specified position.

In a first possible implementation manner of the first aspect, the control instruction is a calibration command; and the controller is configured to send the calibration command to the phase shifter according to the Antenna Interface Standards Group AISG protocol.

In a second possible implementation manner of the first aspect, when the driving rod is at a maximum stroke, the movable contact is in the specified position; and the phase shifter is configured to: when the control instruction is a first control instruction, drive, according to the first control instruction, the driving rod to move to the maximum stroke.

In a third possible implementation manner of the first aspect, when the driving rod is at a minimum stroke, the movable contact is in the specified position; and the phase shifter is configured to: when the control instruction is a second control instruction, drive, according to the second control instruction, the driving rod to move to the minimum stroke.

In a fourth possible implementation manner of the first aspect, there is an antenna array corresponding to the base station, the antenna array is connected to one end of a feeder line, and N ports included at the other end of the feeder line are respectively connected to N remote electrical tilt units in the base station, where N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line; and the controller is configured to: after sending the control instruction to the phase shifter, obtain background noise detection information at the ports at which the feeder line is connected to the N remote electrical tilt units, and determine, according to the background noise detection information, a remote electrical tilt unit corresponding to the antenna array.

According to a second aspect, a switch assembly control method is provided, which is used in the switch assembly according to the first aspect, where the method includes:

receiving, by a controller, an operation instruction, where the operation instruction is used to instruct the controller to control a mechanical normally open switch to close; and sending, by the controller, a control instruction to the phase shifter, where the control instruction is used to instruct the phase shifter to drive the driving rod, so that a movable contact moves to a specified position.

In a first possible implementation manner of the second aspect, the sending, by the controller, a control instruction to the phase shifter includes:

sending the calibration command to the phase shifter according to the Antenna Interface Standards Group AISG protocol, where the control instruction is the calibration command.

In a second possible implementation manner of the second aspect, the sending, by the controller, a control instruction to the phase shifter includes:

sending a first control instruction to the phase shifter, where the first control instruction is used to instruct the phase shifter to drive the driving rod to move to a maximum stroke, where when the driving rod is at the maximum stroke, the movable contact is in the specified position.

In a third possible implementation manner of the second aspect, the sending, by the controller, a control instruction to the phase shifter includes:

sending a second control instruction to the phase shifter, where the second control instruction is used to instruct the phase shifter to drive the driving rod to move to a minimum stroke, where when the driving rod is at the minimum stroke, the movable contact is in the specified position.

In a fourth possible implementation manner of the second aspect, there is an antenna array corresponding to the base station, the antenna array is connected to one end of a feeder line, and N ports included at the other end of the feeder line are respectively connected to N remote electrical tilt units in the base station, where N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line; and the method further includes:

after sending the control instruction to the phase shifter, obtaining background noise detection information at the ports at which the feeder line is connected to the N remote electrical tilt units; and determining, according to the background noise detection information, a remote electrical tilt unit corresponding to the antenna array.

According to a third aspect, a controller is provided, which is used in the switch assembly according to the first aspect, where the controller includes:

an operation instruction receiving module, configured to receive an operation instruction, where the operation instruction is used to instruct the controller to control a mechanical normally open switch to close; and a control instruction sending module, configured to send a control instruction to a phase shifter, where the control instruction is used to instruct the phase shifter to drive a driving rod, so that a movable contact moves to a specified position.

In a first possible implementation manner of the third aspect, the control instruction sending module is configured to send a calibration command to the phase shifter according to the Antenna Interface Standards Group AISG protocol, where the control instruction is the calibration command.

In a second possible implementation manner of the third aspect, the control instruction sending module is configured to send a first control instruction to the phase shifter, and the first control instruction is used to instruct the phase shifter to drive the driving rod to move to a maximum stroke, where when the driving rod is at the maximum stroke, the movable contact is in the specified position.

In a third possible implementation manner of the third aspect, the control instruction sending module is configured to send a second control instruction to the phase shifter, and the second control instruction is used to instruct the phase shifter to drive the driving rod to move to a minimum stroke, where when the driving rod is at the minimum stroke, the movable contact is in the specified position.

In a fourth possible implementation manner of the third aspect, there is an antenna array corresponding to a base station, the antenna array is connected to one end of a feeder line, and N ports included at the other end of the feeder line are respectively connected to N remote electrical tilt units in the base station, where N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line; and the controller further includes:

a detection information obtaining module, configured to: after the control instruction sending module sends the control instruction to the phase shifter, obtain background noise detection information at the ports at which the feeder line is connected to the N remote electrical tilt units; and a determining module, configured to determine, according to the background noise detection information, a remote electrical tilt unit corresponding to the antenna array.

According to a fourth aspect, a base station is provided, where the base station includes:

a remote electrical tilt unit and the switch assembly according to the first aspect or any possible implementation manner of the first aspect.

Beneficial effects of the technical solutions provided in the embodiments of the present application are as follows:

An arranged phase shifter of a remote electrical tilt unit in a base station is used as a driving mechanism of a mechanical normally open switch, and a movable contact of the mechanical normally open switch is arranged to move with a driving rod of the phase shifter; a controller sends a control instruction to the phase shifter after receiving an operation instruction that is used to instruct the controller to control the mechanical normally open switch to close, and the phase shifter drives the driving rod according to the control instruction, so that the movable contact moves to a specified position, and the mechanical normally open switch is triggered to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodi

FIG. 5 is a schematic diagram of a remote electrical tilt antenna test according to another embodiment of the present application;

FIG. 6 is a method flowchart of a switch assembly control method according to an embodiment of the present application;

DESCRIPTION OF EMBODIMENTS

To make the objectives, technical solutions, and advantages of the present application clearer, the following further describes the embodiments of the present application in detail with reference to the accompanying drawings.

Figure 1:
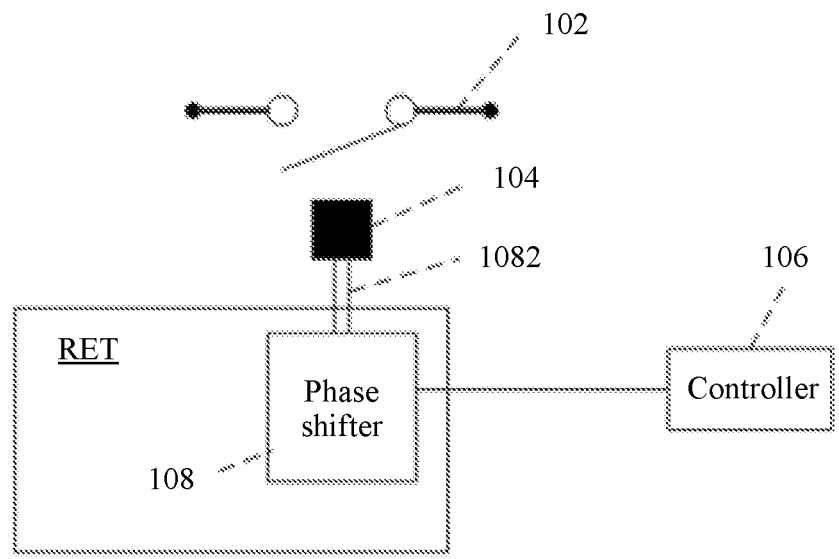
- FIG. 1 is a structural diagram of a switch assembly according to an embodiment of the present application.

Referring to FIG. 1, FIG. 1 shows a structural diagram of a switch assembly according to an embodiment of the present application. The switch assembly may be used in a base station that includes a RET (remote electrical tilt unit). The switch assembly includes: a mechanical normally open switch 102, a movable contact 104, and a controller 106.

The controller 106 is connected to a phase shifter 108 of the remote electrical tilt unit, and the movable contact 104 is arranged to move with a driving rod 1082 of the phase shifter 108; when the movable contact 104 reaches a specified position, the mechanical normally open switch 102 is triggered to close.

The controller 106 is configured to receive an operation instruction, where the operation instruction is used to instruct the controller 106 to control the mechanical normally open switch 102 to close.

The controller 106 is configured to send a control instruction to the phase shifter 108.

The phase shifter 108 is configured to receive the control instruction, and drive the driving rod 1082 according to the control instruction, so that the movable contact 104 moves to the specified position.

A remote electrical tilt antenna is an antenna that electronically adjusts a downtilt angle. A principle of the remote electrical tilt antenna is to change a phase of an antenna element of a collinear array, amplitude values of vertical and horizontal components, and a value of field strength of a synthesized component, so as to adjust a downtilt angle of a vertical directivity diagram of the antenna, and adjust a coverage range of the antenna. The downtilt angle of the remote electrical tilt antenna that is externally connected to the base station may be adjusted by using the remote electrical tilt unit RET that is arranged inside the base station. According to a method provided in an embodiment of the present application, a mechanical normally open switch corresponding to a driving rod of a phase shifter in a RET is arranged, the driving rod of the phase shifter is controlled to drive a movable contact of the mechanical normally open switch, and an existing driving structure in the RET is used to control the mechanical normally open switch to close. Because the mechanical normally open switch is a mechanical part, where spacing between ports is relatively large, interference to a base station signal is not easily caused, intermodulation distortion is not caused, and reliability of the mechanical part is higher than that of a nonlinear element. In addition, in the switch assembly in this embodiment of the present application, no dedicated driving structure needs to be arranged for the movable contact of the mechanical normally open switch, so that a size of the switch assembly is reduced, and an installation difficulty is reduced.

In conclusion, according to the switch assembly provided in this embodiment of the present application, an arranged phase shifter of a remote electrical tilt unit in a base station is used as a driving mechanism of a mechanical normally open switch, and a movable contact of the mechanical normally open switch is arranged to move with a driving rod of the phase shifter; a controller sends a control instruction to the phase shifter after receiving an operation instruction that is used to instruct the controller to control the mechanical normally open switch to close, and the phase shifter drives the driving rod according to the control instruction, so that the movable contact moves to a specified position, and the mechanical normally open switch is triggered to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

Figure 2:
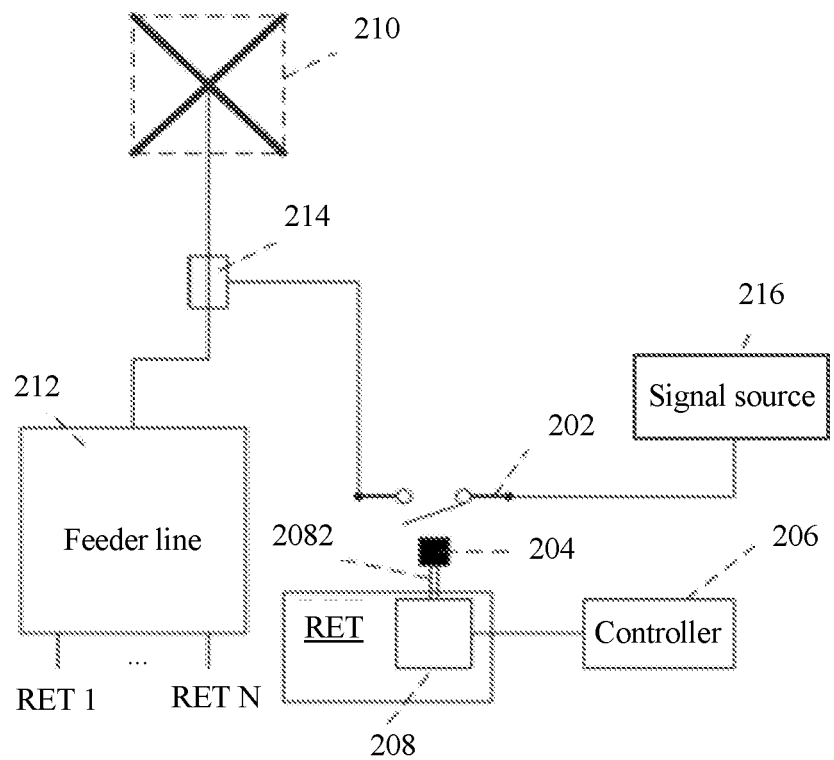
FIG. 2 is a structural diagram of a switch assembly according to another embodiment of the present application.

Referring to FIG. 2, FIG. 2 shows a structural diagram of a switch assembly according to another embodiment of the present application. The switch assembly may be used in a base station that includes a RET. That the switch assembly is used to connect or disconnect a connection between a signal source and an antenna array of a remote electrical tilt antenna when an internal test is performed on the remote electrical tilt antenna externally connected to the base station is used as an example. The switch assembly includes: a mechanical normally open switch 202, a movable contact 204, and a controller 206.

The controller 206 is connected to a phase shifter 208 of the remote electrical tilt unit, and the movable contact 204 is arranged to move with a driving rod 2082 of the phase shifter 208; when the movable contact 204 reaches a specified position, the mechanical normally open switch 202 is triggered to close.

The controller 206 is configured to receive an operation instruction, where the operation instruction is used to instruct the controller 206 to control the mechanical normally open switch 202 to close.

The controller 206 is configured to send a control instruction to the phase shifter 208.

The phase shifter 208 is configured to receive the control instruction, and drive the driving rod 2082 according to the control instruction, so that the movable contact 204 moves to the specified position.

A remote electrical tilt antenna is an antenna that electronically adjusts a downtilt angle. A principle of the remote electrical tilt antenna is to change a phase of an antenna element of a collinear array, amplitude values of vertical and horizontal components, and a value of field strength of a synthesized component, so as to adjust a downtilt angle of a vertical directivity diagram of the antenna, and adjust a coverage range of the antenna. The downtilt angle of the remote electrical tilt antenna that is externally connected to the base station may be adjusted by using the remote electrical tilt unit RET that is arranged inside the base station.

That the mechanical normally open switch is opened or closed by using an elastic metal blade is used as an example. The elastic metal blade is arranged on a moving path of the movable contact, and when the movable contact moves, the elastic metal blade may be touched. When the movable contact moves to a specified position, the elastic metal blade may connect both ends of the switch; when the movable contact leaves the specified position, the elastic metal blade is restored to an original status, so that the switch is opened.

According to the switch assembly provided in this embodiment of the present application, a mechanical normally open switch corresponding to a driving rod of a phase shifter in a RET is arranged, the driving rod of the phase shifter is controlled to drive a movable contact of the mechanical normally open switch, and an existing driving structure in the RET is used to control the mechanical normally open switch to close. Because the mechanical normally open switch is a mechanical part, where spacing between ports is relatively large, interference to a base station signal is not easily caused, intermodulation distortion is not caused, and reliability of the mechanical part is higher than that of a nonlinear element. In addition, in the switch assembly in this embodiment of the present application, no dedicated driving structure needs to be arranged for the movable contact of the mechanical normally open switch, so that a size of the switch assembly is reduced, and an installation difficulty is reduced.

The control instruction is a calibration command, and the controller 206 is configured to send the calibration command to the phase shifter 208 according to the AISG (Antenna Interface Standards Group) protocol.

Because the phase shifter of the RET originally supports the AISG protocol, the controller in this embodiment of the present application may control the phase shifter according to the protocol originally supported by the phase shifter. There is no need to develop a specialized control instruction, and there is only a need to set a parameter in the existing calibration command to achieve a purpose of controlling the switch to close, so that a difficulty of development and deployment is further reduced.

The phase shifter 208 is configured to: when the control instruction is a first control instruction, drive, according to the first control instruction, the driving rod 2082 to move to a maximum stroke. When the driving rod is at the maximum stroke, the movable contact is in the specified position.

Alternatively, the phase shifter 208 is configured to: when the control instruction is a second control instruction, drive, according to the second control instruction, the driving rod 2082 to move to a minimum stroke. When the driving rod is at the minimum stroke, the movable contact is in the specified position.

Figure 3:
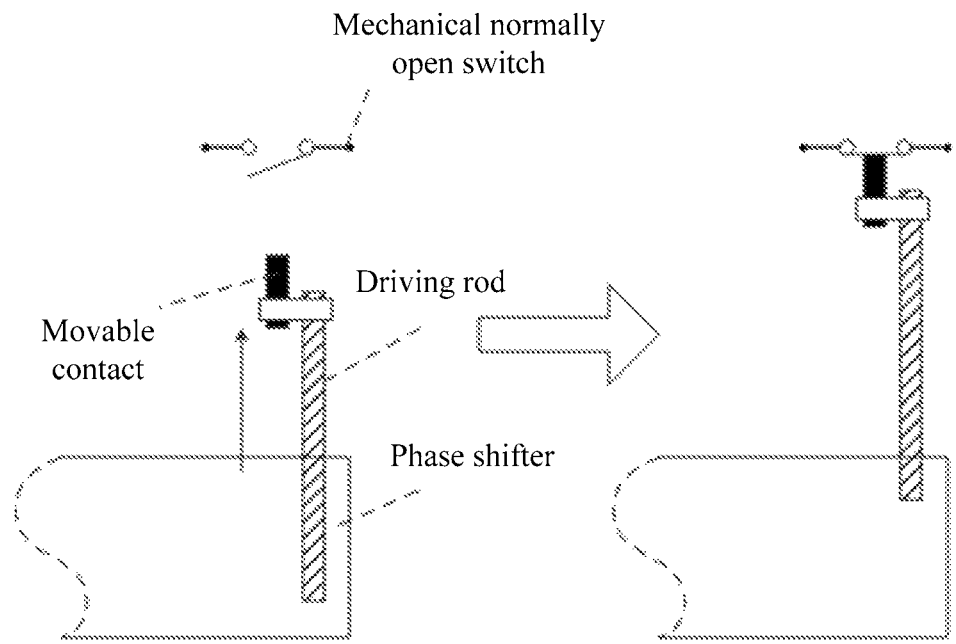
FIG. 3 is a schematic diagram of a driving rod stroke according to another embodiment of the present application.
Figure 4:
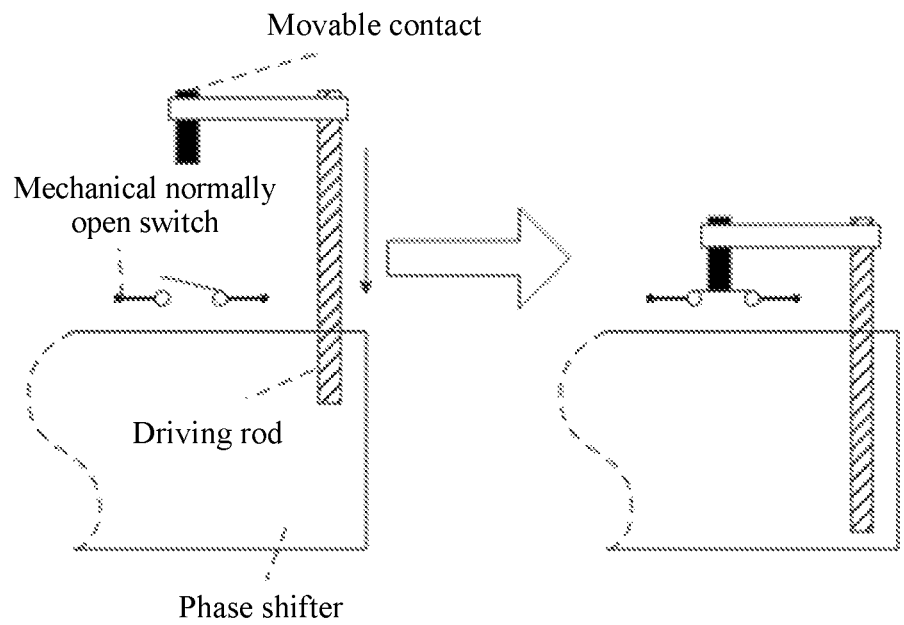
FIG. 4 is a schematic diagram of another driving rod stroke according to another embodiment of the present application.

In addition to controlling the normally open switch to open or close, the phase shifter is further configured to control a downtilt angle of a vertical directivity diagram of the antenna. Therefore, a stroke of the driving rod when the phase shifter controls the mechanical normally open switch to close needs to be set to be out of a stroke range when the phase shifter controls the downtilt angle of the vertical directivity diagram of the antenna, so as to avoid a fault that is caused by closing of the mechanical normally open switch when the phase shifter controls the downtilt angle of the vertical directivity diagram of the antenna. Specifically, it may be set as follows: When the phase shifter controls the driving rod to move to the maximum stroke or the minimum stroke, the movable contact moves with the driving rod to the specified position. That the mechanical normally open switch is opened or closed by using an elastic metal blade is used as an example. According to a schematic diagram of a driving rod stroke shown in FIG. 3, when the phase shifter controls the driving rod to move to the maximum stroke, the movable contact moves with the driving rod to the specified position, and triggers the mechanical normally open switch to close. Alternatively, according to a schematic diagram of another driving rod stroke shown in FIG. 4, when the phase shifter controls the driving rod to move to the minimum stroke, the movable contact moves with the driving rod to the specified position, and triggers the mechanical normally open switch to close.

There is an antenna array 210 corresponding to the base station, the antenna array 210 is connected to one end of a feeder line 212, and N ports included at the other end of the feeder line 212 are respectively connected to N remote electrical tilt units RETs in the base station, where N≥2; one end of the mechanical normally open switch 202 is connected, by using a coupler 214, to a port at which the antenna array 210 is connected to the feeder line 212, and the other end of the mechanical normally open switch 202 is connected to a signal source 216; when the mechanical normally open switch 202 closes, a signal generated by the signal source 216 is sent to the feeder line 212 by using the port at which the antenna array 210 is connected to the feeder line 212.

The controller 206 is configured to: after sending the control instruction to the phase shifter 208, obtain background noise detection information at the ports at which the feeder line 212 is connected to the N remote electrical tilt units, and determine, according to the background noise detection information, a remote electrical tilt unit corresponding to the antenna array 210.

According to a schematic diagram of a remote electrical tilt antenna test shown in FIG. 5, there are N antenna arrays externally connected to the base station, where each antenna array corresponds to one RET, and correspondences between the antenna arrays and the RETs are unknown. Each antenna array is connected to one switch unit by using a coupler, where the switch units are connected to a same signal source, and the switch units are controlled by a same controller. The switch unit includes a mechanical normally open switch, a movable contact, and a phase shifter. Mechanical normally open switches corresponding to the antenna arrays are respectively arranged on phase shifter sides of different RETs, and the movable contact is arranged on the top of a driving rod. A relationship between each phase shifter and the mechanical normally open switch of each antenna array is known. It should be noted that, the known relationship between a phase shifter and an antenna array is not a correspondence between a RET and an antenna array whose downtilt angle of a vertical directivity diagram is controlled by the RET. That is, a phase shifter in the RET may control a mechanical normally open switch corresponding to the antenna array to close, but may be incapable of controlling a downtilt angle of a vertical directivity diagram of the antenna array.

When an operation and maintenance engineer needs to determine a RET corresponding to an antenna array, a corresponding test instruction is sent to the controller, and the controller sends, according to the test instruction, a control instruction to a phase shifter in a switch assembly corresponding to the antenna array. For example, when the operation and maintenance engineer needs to determine a RET corresponding to an antenna array 1 in FIG. 5, the antenna array 1 is selected and tested by using a visual test interface. The controller sends a control instruction to a phase shifter corresponding to the antenna array 1. After receiving the control instruction, the phase shifter drives a movable contact to a specified position, so that a corresponding mechanical normally open switch closes and the antenna array 1 is connected to the signal source. A signal sent by the signal source enters a feeder line by using a coupler, which causes background noise (that is, background noise) at a port corresponding to the other side of the feeder line to change. A receiver on a base station side performs a background noise test on a signal received from each port of the feeder line. The controller obtains background noise test information of each port, and determines that a RET corresponding to a port at which background noise changes accordingly is the RET corresponding to the antenna array 1.

In conclusion, according to the switch assembly provided in this embodiment of the present application, an arranged phase shifter of a remote electrical tilt unit in a base station is used as a driving mechanism of a mechanical normally open switch, and a movable contact of the mechanical normally open switch is arranged to move with a driving rod of the phase shifter; a controller sends a control instruction to the phase shifter after receiving an operation instruction that is used to instruct the controller to control the mechanical normally open switch to close, and the phase shifter drives the driving rod according to the control instruction, so that the movable contact moves to a specified position, and the mechanical normally open switch is triggered to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

In addition, according to the switch assembly provided in this embodiment of the present application, an ASIG calibration command is sent to the phase shifter so as to control the movable contact to move and control the normally open switch to open or close, thereby achieving an effect of further reducing a difficulty of development and deployment.

Finally, according to the switch assembly provided in this embodiment of the present application, when the phase shifter drives, according to the control instruction, the driving rod to move to a maximum stroke or a minimum stroke, the movable contact that moves with the driving rod triggers the switch to close, thereby avoiding occurrence of a fault that the mechanical normally open switch may be triggered to close when an antenna array normally adjusts a downtilt angle of a vertical directivity diagram.

Referring to FIG. 6, FIG. 6 shows a method flowchart of a switch assembly control method according to an embodiment of the present application. The method may be used in the switch assembly shown in FIG. 1 or FIG. 2 to control a mechanical normally open switch to close, where the switch assembly is used in a base station that includes a remote electrical tilt unit. The switch assembly control method may include:

Step 302: A controller receives an operation instruction, where the operation instruction is used to instruct the controller to control the mechanical normally open switch to close.

Step 304: The controller sends a control instruction to a phase shifter, where the control instruction is used to instruct the phase shifter to drive a driving rod, so that a movable contact moves to a specified position.

The switch assembly includes: the mechanical normally open switch, the movable contact, and the controller, where the controller is connected to the phase shifter of the remote electrical tilt unit, and the movable contact is arranged to move with the driving rod of the phase shifter; when the movable contact reaches the specified position, the mechanical normally open switch is triggered to close.

In conclusion, according to the switch assembly control method provided in this embodiment of the present application, a control instruction is sent to an existing phase shifter of a RET in a base station, and the phase shifter drives a driving rod, so that a movable contact that moves with the driving rod moves to a specified position to trigger a mechanical normally open switch to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

Figure 7:
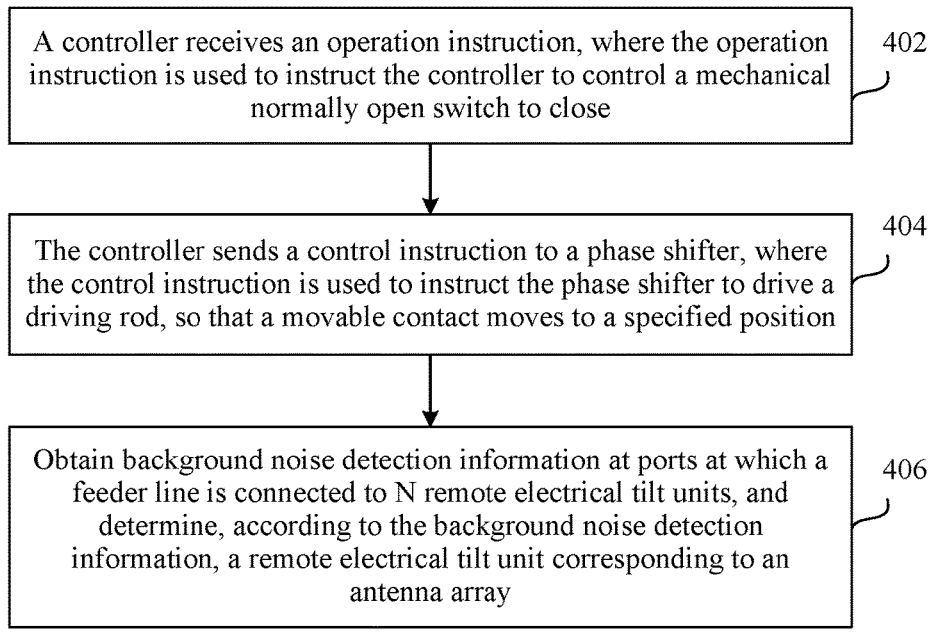
FIG. 7 is a method flowchart of a switch assembly control method according to another embodiment of the present application.

Referring to FIG. 7, FIG. 7 shows a method flowchart of a switch assembly control method according to another embodiment of the present application. The method may be used in the switch assembly shown in FIG. 1 or FIG. 2 to control a mechanical normally open switch to close, where the switch assembly is used in a base station that includes a remote electrical tilt unit. That the switch assembly is used to connect or disconnect a connection between a signal source and an antenna array of a remote electrical tilt antenna when an internal test is performed on the remote electrical tilt antenna externally connected to the base station is used as an example. The switch assembly control method may include:

Step 402: A controller receives an operation instruction, where the operation instruction is used to instruct the controller to control the mechanical normally open switch to close.

The switch assembly includes: the mechanical normally open switch, a movable contact, and the controller, where the controller is connected to a phase shifter of the remote electrical tilt unit, and the movable contact is arranged to move with a driving rod of the phase shifter; when the movable contact reaches a specified position, the mechanical normally open switch is triggered to close.

Step 404: The controller sends a control instruction to a phase shifter, where the control instruction is used to instruct the phase shifter to drive the driving rod, so that the movable contact moves to a specified position.

The control instruction is a calibration command, where the controller sends the calibration command to the phase shifter according to the Antenna Interface Standards Group AISG protocol.

Because the phase shifter of the RET originally supports the AISG protocol, the controller in this embodiment of the present application may control the phase shifter according to the protocol originally supported by the phase shifter. There is no need to develop a specialized control instruction, and there is only a need to set a parameter in the existing calibration command to achieve a purpose of controlling the switch to close, so that a difficulty of development and deployment is further reduced.

The controller sends a first control instruction to the phase shifter, where the first control instruction is used to instruct the phase shifter to drive the driving rod to move to a maximum stroke. When the driving rod is at the maximum stroke, the movable contact is in the specified position.

Alternatively, the controller sends a second control instruction to the phase shifter, where the second control instruction is used to instruct the phase shifter to drive the driving rod to move to a minimum stroke. When the driving rod is at the minimum stroke, the movable contact is in the specified position.

In addition to controlling the normally open switch to open or close, the phase shifter is further configured to control a downtilt angle of a vertical directivity diagram of the antenna. Therefore, a stroke of the driving rod when the phase shifter controls the mechanical normally open switch to close needs to be set to be out of a stroke range when the phase shifter controls the downtilt angle of the vertical directivity diagram of the antenna, so as to avoid a fault that is caused by closing of the mechanical normally open switch when the phase shifter controls the downtilt angle of the vertical directivity diagram of the antenna. Specifically, it may be set as follows: When the phase shifter controls the driving rod to move to the maximum stroke or the minimum stroke, the movable contact moves with the driving rod to the specified position. That the mechanical normally open switch is opened or closed by using an elastic metal blade is used as an example. According to a schematic diagram of a driving rod stroke shown in FIG. 3, when the phase shifter controls the driving rod to move to the maximum stroke, the movable contact moves with the driving rod to the specified position, and triggers the mechanical normally open switch to close. Alternatively, according to a schematic diagram of another driving rod stroke shown in FIG. 4, when the phase shifter controls the driving rod to move to the minimum stroke, the movable contact moves with the driving rod to the specified position, and triggers the mechanical normally open switch to close.

Step 406: Obtain background noise detection information at ports at which a feeder line is connected to N remote electrical tilt units, and determine, according to the background noise detection information, a remote electrical tilt unit corresponding to the antenna array.

There is an antenna array corresponding to the base station, the antenna array is connected to one end of a feeder line, and N ports included at the other end of the feeder line are respectively connected to N remote electrical tilt units in the base station, where N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line.

According to a schematic diagram of a remote electrical tilt antenna test shown in FIG. 5, there are N antenna arrays externally connected to the base station, where each antenna array corresponds to one RET, and correspondences between the antenna arrays and the RETs are unknown. Each antenna array is connected to one switch unit by using a coupler, where the switch units are connected to a same signal source, and the switch units are controlled by a same controller. The switch unit includes a mechanical normally open switch, a movable contact, and a phase shifter. Mechanical normally open switches corresponding to the antenna arrays are respectively arranged on phase shifter sides of different RETs, and the movable contact is arranged on the top of a driving rod. A relationship between each phase shifter and the mechanical normally open switch of each antenna array is known. It should be noted that, the known relationship between a phase shifter and an antenna array is not a correspondence between a RET and an antenna array whose downtilt angle of a vertical directivity diagram is controlled by the RET. That is, a phase shifter in the RET may control a mechanical normally open switch corresponding to the antenna array to close, but may be incapable of controlling a downtilt angle of a vertical directivity diagram of the antenna array.

When an operation and maintenance engineer needs to determine a RET corresponding to an antenna array, a corresponding test instruction is sent to the control, and the controller sends, according to the test instruction, a control instruction to a phase shifter in a switch assembly corresponding to the antenna array. For example, when the operation and maintenance engineer needs to determine a RET corresponding to an antenna array 1 in FIG. 5, the antenna array 1 is selected and tested by using a visual test interface. The controller sends a control instruction to a phase shifter corresponding to the antenna array 1. After receiving the control instruction, the phase shifter drives a movable contact to a specified position, so that a corresponding mechanical normally open switch closes and the antenna array 1 is connected to the signal source. A signal sent by the signal source enters a feeder line by using a coupler, which causes background noise (that is, background noise) at a port corresponding to the other side of the feeder line to change. A receiver on a base station side performs a background noise test on a signal received from each port of the feeder line. The controller obtains background noise test information of each port, and determines that a RET corresponding to a port at which background noise changes accordingly is a RET that controls a downtilt angle of a vertical directivity diagram of the antenna array 1.

In conclusion, according to the switch assembly control method provided in this embodiment of the present application, a control instruction is sent to an existing phase shifter of a RET in a base station, and the phase shifter drives a driving rod, so that a movable contact that moves with the driving rod moves to a specified position to trigger a mechanical normally open switch to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

In addition, according to the switch assembly control method provided in this embodiment of the present application, a controller sends an ASIG calibration command to the phase shifter so as to control the movable contact to move and control the normally open switch to open or close, thereby achieving an effect of further reducing a difficulty of development and deployment.

Finally, according to the switch assembly control method provided in this embodiment of the present application, a control instruction used to instruct the phase shifter to drive the driving rod to move to a maximum stroke or a minimum stroke is sent, so that the movable contact that moves with the driving rod triggers the switch to close, thereby avoiding occurrence of a fault that the mechanical normally open switch may be triggered to close when an antenna array normally adjusts a downtilt angle of a vertical directivity diagram.

Figure 8:
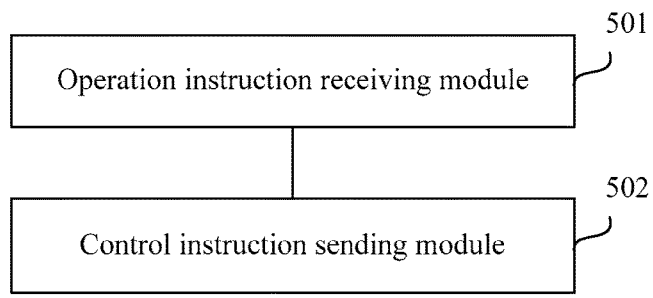
FIG. 8 is an apparatus structural diagram of a controller according to an embodiment of the present application.

Referring to FIG. 8, FIG. 8 shows an apparatus structural diagram of a controller according to an embodiment of the present application. The controller may be used in the switch assembly shown in FIG. 1 or FIG. 2 to control a mechanical normally open switch to close, where the switch assembly is used in a base station that includes a remote electrical tilt unit. The controller may include:

an operation instruction receiving module 501, configured to receive an operation instruction, where the operation instruction is used to instruct the controller to control the mechanical normally open switch to close; and a control instruction sending module 502, configured to send a control instruction to a phase shifter, where the control instruction is used to instruct the phase shifter to drive a driving rod, so that a movable contact moves to a specified position.

In conclusion, according to the controller provided in this embodiment of the present application, a control instruction is sent to an existing phase shifter of a RET in a base station, and the phase shifter drives a driving rod, so that a movable contact that moves with the driving rod moves to a specified position to trigger a mechanical normally open switch to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

Figure 9:
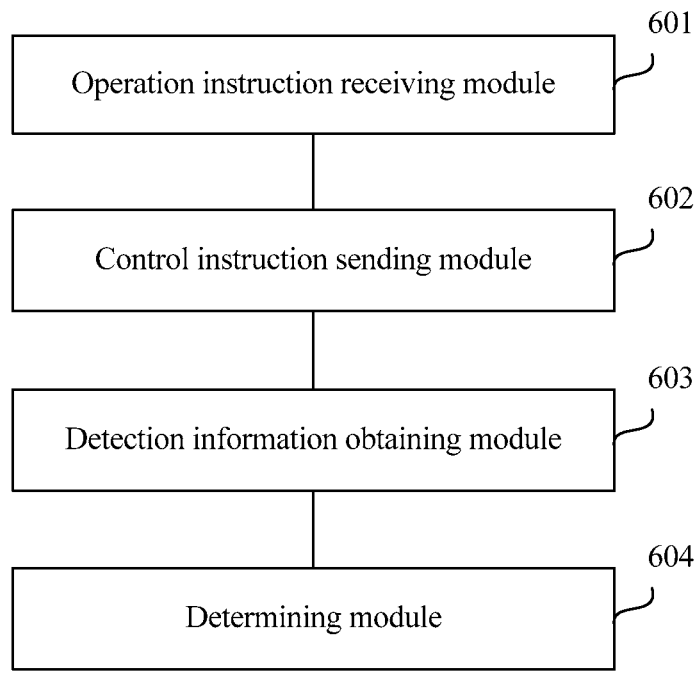
FIG. 9 is an apparatus structural diagram of a controller according to another embodiment of the present application.

Referring to FIG. 9, FIG. 9 shows an apparatus structural diagram of a controller according to another embodiment of the present application. The controller may be used in the switch assembly shown in FIG. 1 or FIG. 2 to control a mechanical normally open switch to close, where the switch assembly is used in a base station that includes a remote electrical tilt unit. That the switch assembly is used to connect or disconnect a connection between a signal source and an antenna array of a remote electrical tilt antenna when an internal test is performed on the remote electrical tilt antenna externally connected to the base station is used as an example. The controller may include:

an operation instruction receiving module 601, configured to receive an operation instruction, where the operation instruction is used to instruct the controller to control the mechanical normally open switch to close; and a control instruction sending module 602, configured to send a control instruction to a phase shifter, where the control instruction is used to instruct the phase shifter to drive a driving rod, so that a movable contact moves to a specified position.

The control instruction sending module 602 is configured to send a calibration command to the phase shifter according to the Antenna Interface Standards Group AISG protocol, where the control instruction is the calibration command.

The control instruction sending module 602 is configured to send a first control instruction to the phase shifter, where the first control instruction is used to instruct the phase shifter to drive the driving rod to move to a maximum stroke.

When the driving rod is at the maximum stroke, the movable contact is in the specified position.

The control instruction sending module 602 is configured to send a second control instruction to the phase shifter, where the second control instruction is used to instruct the phase shifter to drive the driving rod to move to a minimum stroke.

When the driving rod is at the minimum stroke, the movable contact is in the specified position.

There is an antenna array corresponding to the base station, the antenna array is connected to one end of a feeder line, and N ports included at the other end of the feeder line are respectively connected to N remote electrical tilt units in the base station, where N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line; and the controller further includes:

a detection information obtaining module 603, configured to: after the control instruction sending module 602 sends the control instruction to the phase shifter, obtain background noise detection information at the ports at which the feeder line is connected to the N remote electrical tilt units; and a determining module 604, configured to determine, according to the background noise detection information, a remote electrical tilt unit corresponding to the antenna array.

In conclusion, according to the controller provided in this embodiment of the present application, a control instruction is sent to an existing phase shifter of a RET in a base station, and the phase shifter drives a driving rod, so that a movable contact that moves with the driving rod moves to a specified position to trigger a mechanical normally open switch to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

In addition, according to the controller provided in this embodiment of the present application, an ASIG calibration command is sent to the phase shifter so as to control the movable contact to move and control the normally open switch to open or close, thereby achieving an effect of further reducing a difficulty of development and deployment.

Finally, according to the controller provided in this embodiment of the present application, a control instruction used to instruct the phase shifter to drive the driving rod to move to a maximum stroke or a minimum stroke is sent, so that the movable contact that moves with the driving rod triggers the switch to close, thereby avoiding occurrence of a fault that the mechanical normally open switch may be triggered to close when an antenna array normally adjusts a downtilt angle of a vertical directivity diagram.

Figure 10:
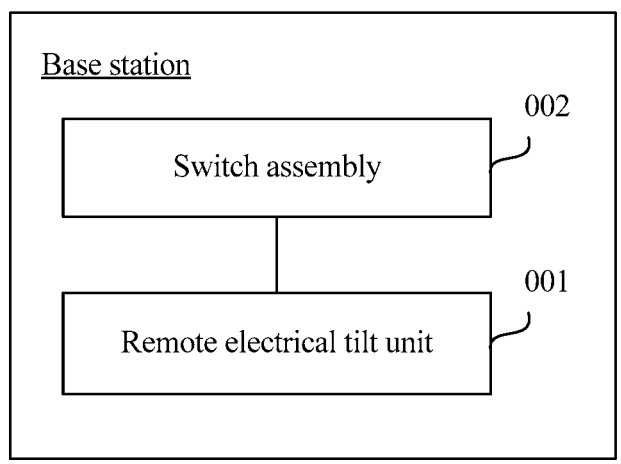
FIG. 10 is a composition block diagram of a base station according to an embodiment of the present application.

Referring to FIG. 10, FIG. 10 shows a composition block diagram of a base station according to an embodiment of the present application. The base station includes:

a remote electrical tilt unit 001 and the switch assembly 002 shown in any one of the foregoing FIG. 1 or FIG. 2.

In conclusion, according to the base station provided in this embodiment of the present application, a controller sends a control instruction to an existing phase shifter of a RET in a base station, and the phase shifter drives a driving rod, so that a movable contact that moves with the driving rod moves to a specified position to trigger a mechanical normally open switch to close. Because the mechanical normally open switch is a mechanical part and no dedicated driving structure needs to be arranged for the movable contact of the mechanical normally open switch, a size of the switch assembly is reduced, and a prior-art problem that interference is caused to a base station signal because an integrated semiconductor chip radio frequency switch is a nonlinear element and a problem that installation is relatively difficult because a volume of a relay switch is relatively large are resolved, thereby reducing an installation difficulty while avoiding interference caused to a base station signal.

In addition, according to the base station provided in this embodiment of the present application, the controller sends an ASIG calibration command to the phase shifter so as to control the movable contact to move and control the normally open switch to open or close, thereby achieving an effect of further reducing a difficulty of development and deployment.

Finally, according to the base station provided in this embodiment of the present application, the controller sends a control instruction used to instruct the phase shifter to drive the driving rod to move to a maximum stroke or a minimum stroke, so that the movable contact that moves with the driving rod triggers the switch to close, thereby avoiding occurrence of a fault that the mechanical normally open switch may be triggered to close when an antenna array normally adjusts a downtilt angle of a vertical directivity diagram.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A switch assembly, used in a base station that comprises a remote electrical tilt unit, wherein the switch assembly comprises: a mechanical normally open switch, a movable contact, and a controller, wherein
   the controller is connected to a phase shifter of the remote electrical tilt unit, and the movable contact is arranged to move with a driving rod of the phase shifter; when the movable contact reaches a specified position, the mechanical normally open switch is triggered to close;
   the controller is configured to receive an operation instruction, wherein the operation instruction is used to instruct the controller to control the mechanical normally open switch to close;
   the controller is configured to send a control instruction to the phase shifter; and
   the phase shifter is configured to receive the control instruction, and drive the driving rod according to the control instruction, so that the movable contact moves to the specified position.

2. The switch assembly according to claim 1, wherein the control instruction is a calibration command; and
   the controller is configured to send the calibration command to the phase shifter according to the Antenna Interface Standards Group (AISG) protocol.

3. The switch assembly according to claim 1, wherein when the driving rod is at a maximum stroke, the movable contact is in the specified position; and
   the phase shifter is configured to: when the control instruction is a first control instruction, drive, according to the first control instruction, the driving rod to move to the maximum stroke.

4. The switch assembly according to claim 1, wherein when the driving rod is at a minimum stroke, the movable contact is in the specified position; and
   the phase shifter is configured to: when the control instruction is a second control instruction, drive, according to the second control instruction, the driving rod to move to the minimum stroke.

5. The switch assembly according to claim 1, wherein there is an antenna array corresponding to the base station, the antenna array is connected to one end of a feeder line, and N ports comprised at the other end of the feeder line are respectively connected to N remote electrical tilt units in the base station, wherein N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line; and
   the controller is configured to: after sending the control instruction to the phase shifter, obtain background noise detection information at the ports at which the feeder line is connected to the N remote electrical tilt units, and determine, according to the background noise detection information, a remote electrical tilt unit corresponding to the antenna array.

6. A switch assembly control method, wherein the method comprises:
   receiving, by a controller, an operation instruction, wherein the operation instruction is used to instruct the controller to control a mechanical normally open switch to close; and sending, by the controller, a control instruction to a phase shifter, wherein the control instruction is used to instruct the phase shifter to drive the driving rod, so that a movable contact moves to a specified position;

wherein the sending, by the controller, a control instruction to the phase shifter comprises:

sending a first control instruction to the phase shifter, wherein the first control instruction is used to instruct the phase shifter to drive the driving rod to move to a maximum stroke, wherein when the driving rod is at the maximum stroke, the movable contact is in the specified position.

7. The method according to claim 6, wherein the sending, by the controller, a control instruction to the phase shifter comprises:

sending a calibration command to the phase shifter according to the Antenna Interface Standards Group (AISG) protocol, wherein the control instruction is the calibration command.

8. The method according to claim 6, wherein there is an antenna array corresponding to a base station, the antenna array is connected to one end of a feeder line, and N ports comprised at the other end of the feeder line are respectively connected to N remote electrical tilt units in the base station, wherein N≥2; one end of the mechanical normally open switch is connected, by using a coupler, to a port at which the antenna array is connected to the feeder line, and the other end of the mechanical normally open switch is connected to a signal source; when the mechanical normally open switch closes, a signal generated by the signal source is sent to the feeder line by using the port at which the antenna array is connected to the feeder line; and the method further comprises:

after sending the control instruction to the phase shifter, obtaining background noise detection information at the ports at which the feeder line is connected to the N remote electrical tilt units; and determining, according to the background noise detection information, a remote electrical tilt unit corresponding to the antenna array.

\* \* \* \* \*